United States Patent [19]

Wyss

[11] 4,104,500
[45] Aug. 1, 1978

[54] DEVICE FOR ELECTRICAL DISCHARGE MACHINING WITH SIMULTANEOUS RELATIVE ADVANCE AND CYCLE TRANSLATIONAL MOVEMENT OF THE ELECTRODES

[75] Inventor: Georges Wyss, Niederrohrdorf, Switzerland

[73] Assignee: Ateliers des Charmilles S.A., Geneva, Switzerland

[21] Appl. No.: 696,712

[22] Filed: Jun. 16, 1976

[30] Foreign Application Priority Data

Jun. 18, 1975 [CH] Switzerland .......................... 7932/75
Sep. 8, 1975 [CH] Switzerland ........................ 11598/75

[51] Int. Cl.² ............................................... B23P 1/08
[52] U.S. Cl. .................................... 219/69 V; 90/15 B
[58] Field of Search ................. 219/69 E, 69 V, 69 R, 219/69 M, 69W; 90/15 A, 15 B

[56] References Cited

U.S. PATENT DOCUMENTS

| | | | |
|---|---|---|---|
| 2,773,968 | 12/1956 | Martellotti et al. | 219/69 V |
| 3,135,852 | 6/1964 | Bentley et al. | 219/69 V |
| 3,539,754 | 11/1970 | Furze et al. | 219/69 V |
| 3,809,852 | 5/1974 | Weber | 219/69 V |

*Primary Examiner*—Bruce A. Reynolds
*Attorney, Agent, or Firm*—Hauke and Patalidis

[57] ABSTRACT

In the electrical discharge machining of the surface of a recess in a workpiece electrode to a shape corresponding to that of a tool electrode, the electrodes are relatively displaced, during a finishing phase of machining, along an axis of penetration and simultaneously in a plane perpendicular to the axis of penetration with a cyclic translational movement whose amplitude increases with the penetration of the tool in the workpiece. This provides a virtual three-dimensional dilatation of the tool as it advances, and enables control of the sparking in both the frontal and lateral parts of the machining zone. The cyclic translational movements are obtained from a rotatable shaft having an axis parallel to the axis of penetration and an eccentric member cooperating with the rotatable shaft to slide relative to the shaft in a direction forming a predetermined angle with the direction of penetration, the eccentric member being rotated in unison with the shaft about its axis.

10 Claims, 6 Drawing Figures

DEVICE FOR ELECTRICAL DISCHARGE MACHINING WITH SIMULTANEOUS RELATIVE ADVANCE AND CYCLE TRANSLATIONAL MOVEMENT OF THE ELECTRODES

CROSS-REFERENCE TO RELATED APPLICATION

This application is related to application Ser. No. 696,713, filed on the same date as the present application and assigned to the same assignee.

The invention relates to a device for an apparatus for electrical discharge machining, of the type comprising means for displacing the electrodes relative to one another in translation in two directions perpendicular to an axis of penetration of the tool in the workpiece, means for imparting to the electrodes a given relative movement in the plane of this translation, means for transmitting to the amplitude of this translational movement the relative movements of the electrodes towards and away from one another along said axis of penetration of the tool in the workpiece, said movements being controlled so as to maintain given sparking conditions in the machining zone comprised between the electrodes.

Such a device is described, for example, in U.S. Pat. No. 3 539 754 and enables machining of the lateral surfaces of the workpiece to a different shape than the shape of the tool. The machined shape, which is, for example, determined by the factor of proportionality between the amplitude of the translational movement and the axial displacement of the tool, corresponds to the shape of an envelope of the trajectories during the cyclic translational movements.

An other device, with which an orifice of increasing conicity is machined with a tool in the form of a flat disc, is described in W. German published patent application (DOS) No. 2 238 698. Theoretically, this last device could be used for producing a three-dimensional dilatation of the tool electrode in order to machine a recess having substantially the same shape as the tool. However, this device is complicated and comprises numerous mechanical parts connected one to the other, so that it would be mostly inoperative for imparting to the tool the very short displacement which must be effected very quickly and with accuracy when machining simultaneously the front and lateral faces of a recess with a dilated electrode tool.

The invention aims to provide a new device, which can be easily manufactured and which displaces the electrode with the desired stiftness and accuracy.

The accompanying drawings show, schematically and by way of example, two embodiments of the device according to the invention.

DETAILED DESCRIPTION OF THE PREFERRED EMBODIMENTS

Figure 1:
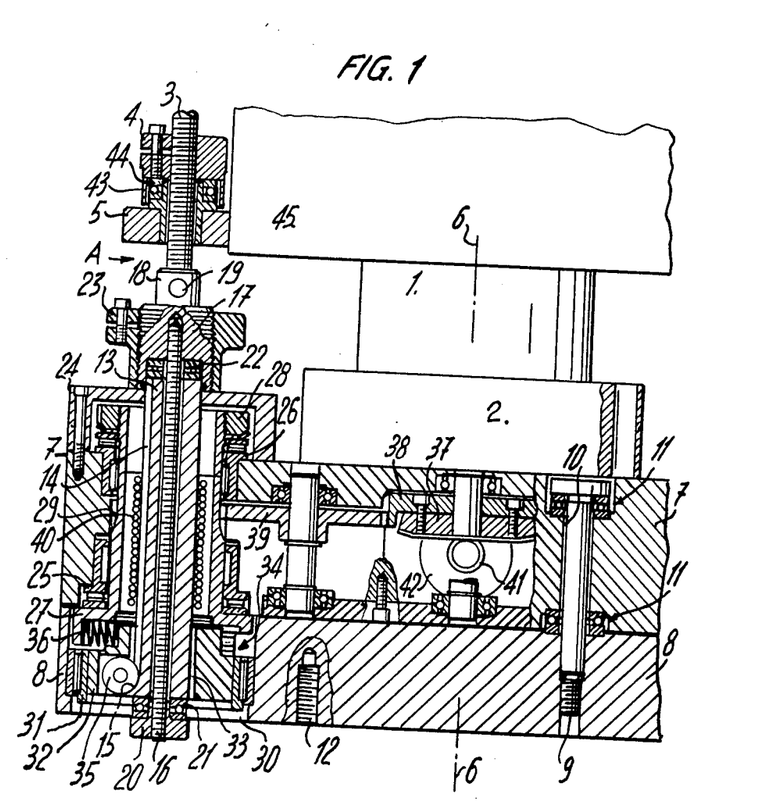
FIG. 1 is a partial view in longitudinal cross-section of a first embodiment.
Figure 2:
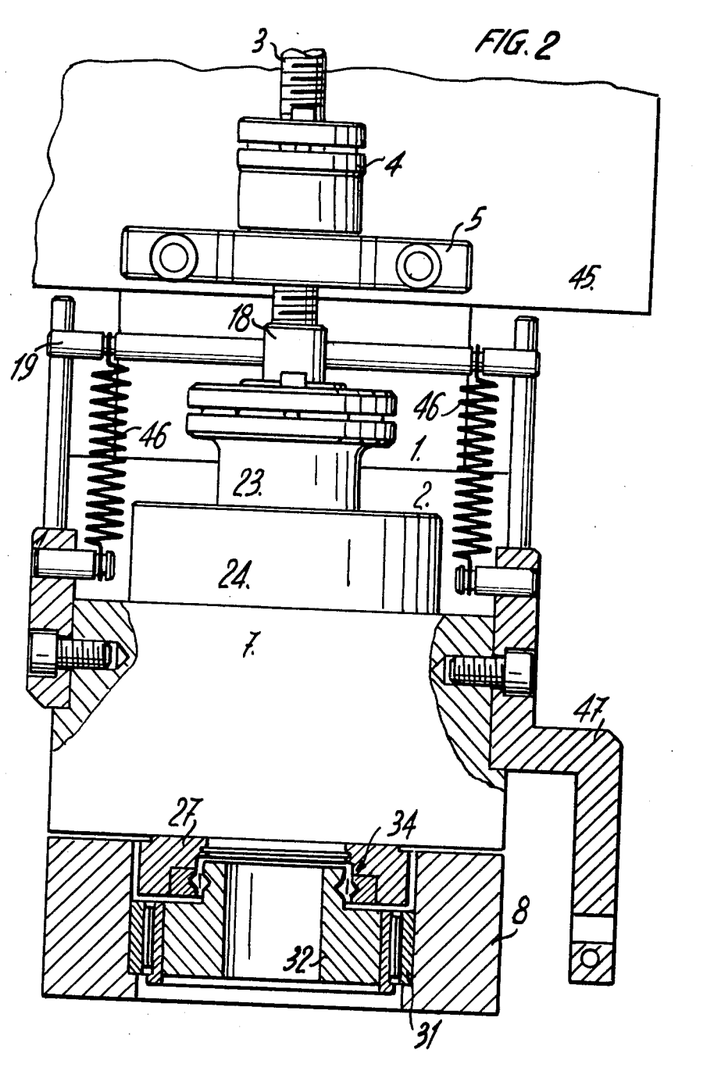
FIG. 2 is a view along arrow A of FIG. 1, partly cut away and in cross-section.

The device A of FIGS. 1 and 2 is carried mainly by a plate 2 fixed to a piston 1 of an electrical discharge machine. This device is connected to a bracket 5 of the machine by two threaded rods 3 engaging in setting nuts 4. The device A is generally symmetrical about a plane of symmetry 6, only its left hand part being shown in FIG. 1. A second rod, identical to rod 3, is thus disposed to the right of the machine and is not shown in the drawings.

During finish machining, the piston 1 is moved axially. The plate 2 carries a block 7 enclosing a gear mechanism and provided with an electrode support 8. Piston 1, plate 2 and block 7 form a compact unit in relation to which the electrode support 8 can move in translation in its horizontal plane. This displacement of support 8 in relation to the block 7 is made possible by tie-bolts 9 which each pass through a bore of block 7 with a play 10. The support 8 is connected to block 7 by the tie-bolts 9 with interposed abutment bearings 11 allowing displacement of the support 8 in relation to block 7 within the limits of play 10. The support 8 has screw-threaded openings 12 for receiving bolts securing an electrode, not shown.

The parts of the device which serve to produce translational displacements of the support 8 in relation to block 7 will now be described.

A hollow guide shaft 13 passes through the block 7 and electrode support 8. This shaft 13 has a longitudinal groove 14 having a terminal part forming a ramp 15. The shaft 13 turns freely about a rod 16 which passes through the shaft 13 and is threaded at least at each end. Rod 16 is fixed in a piece 17 connected to the threaded rod 3. Piece 17 has a portion 18 in which rod 3 is secured by a transverse pin 19. Thus, rod 3, portion 18, piece 17 and rod 16 form a rigid assembly in the longitudinal direction.

At the lower end of rod 16 is a nut 20 axially fixing the shaft 13 to said rigid assembly, while allowing it to turn freely on two axial ball-bearings 21 and 22.

The piece 17 has an external thread screwed in a setting nut 23 bearing on a cap 24 secured on block 7 by screws. Hence, all of the elements of the device, in as much as they are not supported by bracket 5, are carried by the plate 2.

The block 7 is provided with two combined axial and radial needle bearings 25 and 26 on which a sleeve 27 is pivotally mounted. Bearings 25 and 26 are set by a nut 28. The shaft 13 is slidably mounted in sleeve 27 by means of a ball-slide 29, known per se. It is hence possible to control an axial movement of the shaft 13 in sleeve 27 either by nut 23 or by nut 4, as will be explained further on.

The electrode support 8 has a housing 30 in which is disposed a radial needle-bearing 31 on which an eccentric 32 is pivotally mounted. The eccentric 32 is annular and surrounds the shaft 13 with a play 33 which may be equal to play 10. The upper part of eccentric 32 and the lower part of sleeve 27 engage with one another by a radial slide 34 so that the eccentric 32 may move radially in relation to the sleeve 27 by the amount of play 33. This radial movement of the eccentric 32 is controlled by a roller 35 mounted on the eccentric for cooperation with ramp 15. A spring 36, acting between the sleeve 27 and eccentric 32, biases the eccentric 32 to tend to keep it centred in relation to shaft 13. The block 7 also houses transmission members including a bevel pinion 37 fixed on a toothed wheel 38 meshing with another toothed wheel 39 which in turn meshes with an external toothing 40 on sleeve 27. The bevel pinion 37 is rotatably driven by a bevel pinion 41 of an electric motor 42. As the roller 35 of eccentric 32 is engaged in the slot 14 of shaft 13, the latter is also rotatably driven by the eccentric 32. When the eccentric 32 is disposed centrally about the shaft 13, i.e. with zero eccentricity, no displacement of the electrode support 8 relative to block 7 is produced in response to rotation of the shaft 13 and eccentric 32.

The bracket 5 is provided with a sleeve 43 of insulating material through which the threaded rod 3 passes with play. This sleeve 43 carries the setting screw 4 by the intermediary of an axial ball bearing 44. The transverse pin 19 is urged by two traction springs 46 so that shaft 13 correctly bears against the bracket 5 fixed on the frame 45 of the machine. The springs 46 are indirectly connected to block 7. As shown in FIG. 2, block 7 also carries a bracket 47 adapted to carry a comparator, not shown.

It has already been stated above that the device is generally symmetrical about the plane 6. However, this symmetry does not apply to the elements, 1, 2, 7, 8, 41, 42, 37, 38 and 45. In accordance with this symmetry, the device comprises two eccentrics 32 with two slides 34 parallel to one another for a given position of the eccentrics disposed on the same line. When the eccentric 32 is decentred in relation to shaft 13, the entire electrode support 8 moves as an eccentric connecting rod.

In an example of carrying out the method according to the invention, the device of FIGS. 1 and 2 is used as follows:

Firstly, one proceeds to adjust the position of eccentrics 32 so that they have a zero eccentricity on their respective shaft 13 when the nut 23 bears against the upper face of cap 24. This adjustment is carried out by turning each nut 23 relative to piece 17 to axially displace the shaft 13 until the roller 35 lies on ramp 15 in a position giving zero eccentricity. To carry out this adjustment, a comparator is placed on each bracket 47 with a sensor of the comparator applied against the electrode support 8. The motor 42 is started, and the described adjustment is carried out until the comparator indicates that the support 8 is not deviated while the motor continues to rotate the eccentrics.

Then the desired depth of machining is adjusted by acting on nut 4. If, during this adjustment, the electrode rests on the upper face of the workpiece, the depth of machining corresponds to the distance the nut must travel to abut against the axial bearing 44, plus the displacement during finishing machining and the spark distance during the finishing phase.

Rough machining is then carried out, by advancing the electrode in the conventional manner to make it penetrate in the workpiece. During this first phase of machining, the nut 23 rests on the cap 24 so that the electrode is not subjected to a translational movement since the device has a zero eccentricity. During this first phase, the piston 1 controls the advance of the electrode. As this advance progresses, the nut 4 moves towards its position of abutment against the bracket 5 and, when this position is reached, the machining passes from the rough phase to the finishing phase.

As soon as the nut 4 abuts against the bearing 44, any further displacement of the piston 1 towards the workpiece produces a displacement of shaft 13 relative to the main part of the device and hence produces an increasing eccentricity of shaft 13. This eccentricity is very small and in general remains well below 1 millimeter. Consequently, the cavity machined in the workpiece has the same shape as the electrode.

The rigid linkage which determines the degree of eccentricity of the translational movement as a function of the advance of the electrode from the moment when the nut 4 has reached its axial abutment position produces a virtual dilatation of the electrode in a plane perpendicular to the axial direction along which it advances. This arrangement is very advantageous since as soon as the machining conditions tend to deteriorate and it is consequently necessary to slightly withdraw the electrode, this withdrawal is accompanied by a reduction of the amplitude of translation and hence of the virtual dilatation of the electrode. Hence, the servo-control device, which operates solely in the axial direction, simultaneously controls a radial withdrawal of the envelope generated by the translational movement of the electrode. Thus, the servo-control device can operate to adjust the position of the electrode as a function of the instantaneous machining conditions while taking into account the conditions of both the frontal machining distance and the lateral machining distance.

The embodiment of FIGS. 3 to 6 involves an improvement in that the device is of simpler construction without a reduction of the quality of machining.

In this embodiment, the device is not symmetrical about plane 6. The machine has a frame 45 and a piston 1 carrying plate 2. There is only a single control device, visible in the left hand part of FIG. 3. The block 7' is fixed to the plate 2 and a casing 55 is rigidly fixed, with an interposed insulating plate 56, to the plate 2. Electrode support 8' is connected to block 7' by a table with a cross-sliding arrangement including slides 48 and 49. The support 8' is rigidly connected to a lower casing 58 with an interposed insulating plate 57. The casings 55 and 58 are connected together by tie-bolts 9 having bearings 11 allowing relative displacements of the casings in a horizontal plane, within the limits of play 10.

Figure 5:
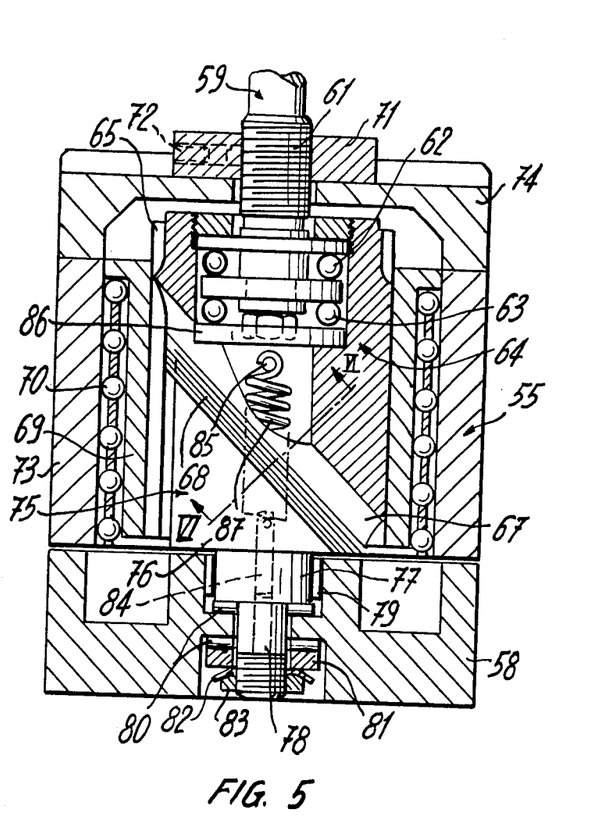
FIG. 5 is a cross-section along line V—V of FIG. 4.

A device for producing a translational movement of support 8' with a variable radius comprises a vertical rod 59 having a square portion 60 as well as a threaded part 61 towards its lower end, as shown in FIG. 5. The lower end of rod 59 is mounted in two axial bearings 62 and 63 so as to be connected without axial play to a piece 64 while being able to freely turn in relation to piece 64.

Figure 6:
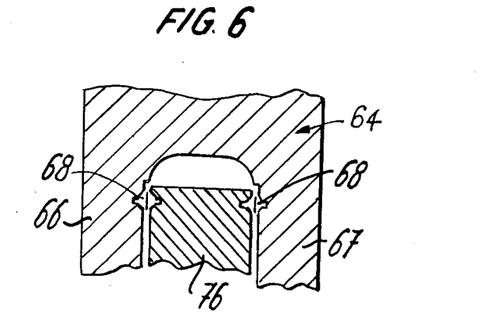
FIG. 6 is a cross-section along line VI—VI of FIG. 5.

The upper end of piece 64 has a toothing 65 by which it can be rotatably driven by a motor and gears, not shown, analogous to those of the first embodiment. This piece 64 has a lower fork-shaped part having lateral branches 66 and 67 (FIG. 6). These branches 66, 67 have, on their inner faces, a part of two rectilinear guide devices 68.

The two guide devices 68 are inclined to the axis of rotation of piece 64 at an angle of 45° in the example shown.

The piece 64 is placed in a sleeve 69 carrying a cage of balls 70 forming a bearing with the casing 55 and allowing both rotation and axial displacement of the piece 64 in casing 55. The rod 59 protrudes from casing 55 by its threaded portion 61 which carries an abutment nut 71 which can be locked in position by a screw 72. For the purposes of assembly, the casing 55 is formed of two parts, a hollow rectangular part 73 and a cover 74.

An eccentric 75 of variable eccentricity is formed by a triangular plate 76 sliding between the branches 66 and 67 along guide devices 68. This plate 76 carries two downwardly-protruding coaxial studs 77 and 78 pivoting in casing 58 by the intermediary of a radial bearing 79 and two axial bearings 80.

To eliminate any axial play between the eccentric 75 and casing 58, a nut 83 is screwed on a threaded terminal portion of stud 78. This nut 83 is locked by a safety washer 82 and enables adjustment of the axial bearings 80 by the intermediary of a washer 81.

The eccentric 75 also has an axial bore in which is placed a setting screw 84 forming a hooking point for an end of a spring 87 whose other end is hooked on a pin 85 of piece 64. This spring 87 biases the rod 59 and piece 64 downwards towards the eccentric 75.

The eccentric 75 is thus situated at the lower end of piece 64, and the guide devices 68 form a ramp between the piece 64 and eccentric 75. An axial displacement of piece 64 in relation to casing 55 produces a radial displacement of the eccentric 75 together with casing 58.

Figure 3:
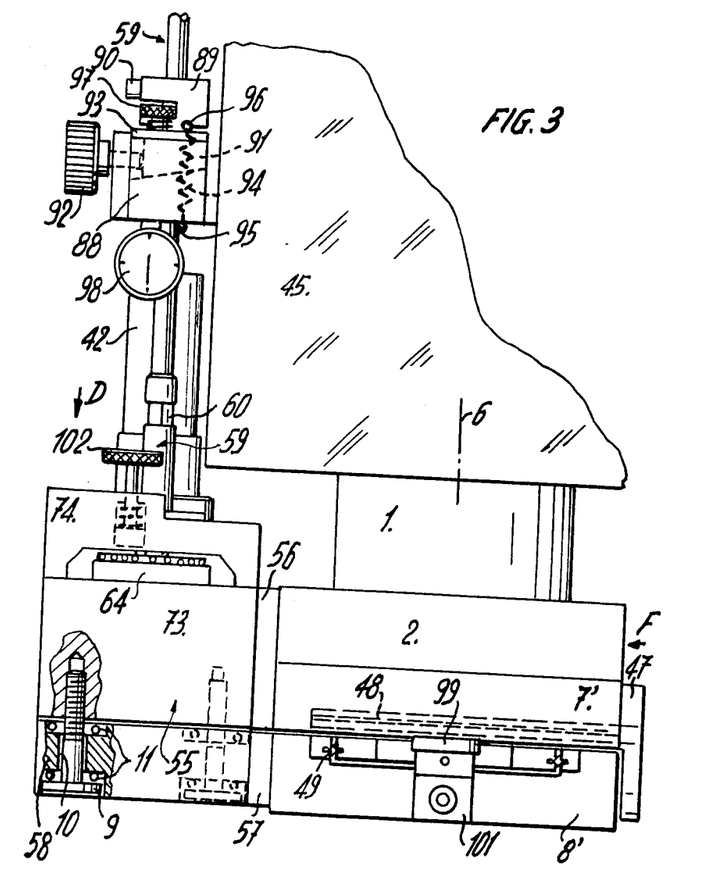
FIG. 3 is a partly cut-away side elevational view of a second embodiment.
Figure 4:
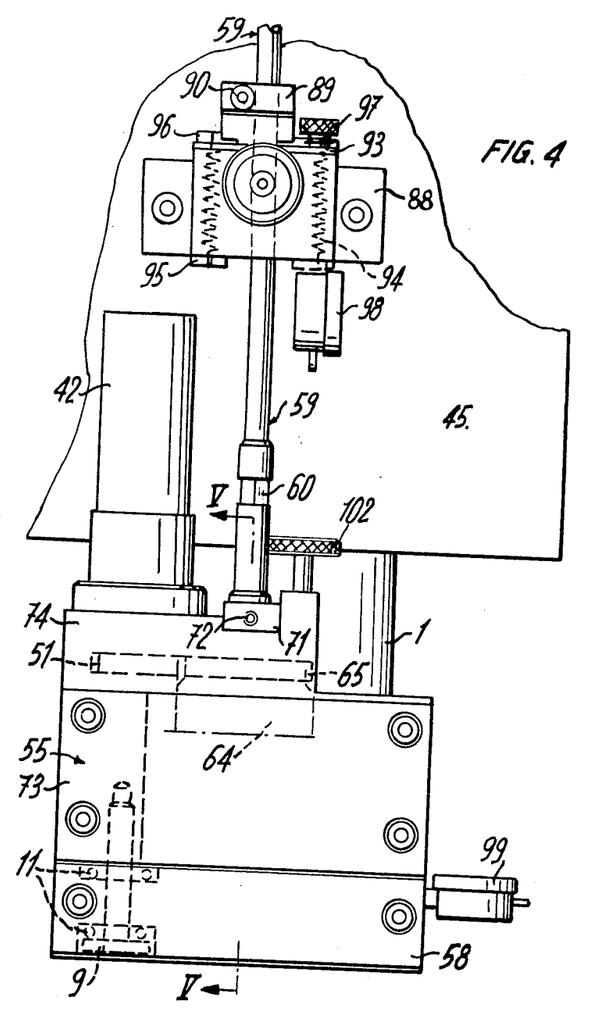
FIG. 4 is an end elevational view of the device of FIG. 3.

The upper part of rod 59 is smooth and engages in an opening of a casing 88 fixed to the frame 45 of the machine. This rod 59 carries an adjustable piece 89 whose position on rod 59 can be set by a screw 90. Piece 89 has the same role as the nut 4 of FIG. 1, i.e. it determines the depth of penetration of the electrode from which machining should be carried out with translation of the electrode.

The casing 88 also contains a wedge 91 able to be moved towards the right, FIG. 3, by means of a setting screw 92 against the action of a biasing spring, not shown. A plate 93 is placed on wedge 91 and is applied against it by two traction springs 94. These springs 94 are hooked at their lower ends on pins 95 held under the casing 88 and at their upper ends on pins 96 bearing on the plate 93 which forms an abutment for piece 89.

The position of plate 93, set by the screw 92 and wedge 91, can be detected by a comparator 98 having a feeler in contact with the end of a screw 97 engaged in a threaded hole of plate 93.

Operation of the device of FIGS. 3 to 6 is very similar to that of the first embodiment.

The position of nut 71 can be set to provide a zero eccentricity of the eccentric 75 when the nut 71 bears on cover 74. Adjustment of the position of piece 89 on rod 55 sets the distance by which the electrode penetrates in the workpiece without translation.

During machining, the piston 1 is controlled to move the electrode and make it penetrate into the workpiece. This movement is purely axial as long as the piece 89 has not come to abut against the plate 93. However, from this moment, the rod 59 can no longer advance at the same time as the plate 2 so that a relative axial displacement is produced between the rod 59 and casing 55. The device of FIG. 5 then controls an eccentricity which increases linearly with the axial advance produced by piston 1. To obtain a translational movement with a substantially circular trajectory, it is of course necessary to rotatably drive the piece 64 by means of electric motor 42.

It is clear that in certain cases, a circular translational movement of the electrode may be undesirable. For example, when the cavity to be machined must have in its lateral wall an angle or a dihedron having a sharp angle in cross-section, a circular translation must not be used; to the contrary, it is advantageous to machine with a radial translation along a given direction, preferably in a plane that bisects the sharp angle. This is obtained by stopping the motor 42 and angularly setting the guide devices 68 parallel to said plane.

It should be remarked that although the described guide devices 68 are inclined by 45°, good results may be obtained with other angles of inclination.

When translation is provided in a radial plane, i.e. when the motor 42 does not drive piece 64, orientation of the radial plane is facilitated by an arrangement, shown in FIG. 3, consisting of a stop rod 102 slidably mounted in the cover 74 and having an end that can be placed in any one of a series of notches in the upper face of piece 64. Hence, the piece 64 can be locked in a well determined angular position during the machining operation in question.

It is also clear that when carrying out the method it is not essential to provide a purely axial advance of the electrode during the initial phase of machining. To the contrary, it is possible when carrying out the preliminary adjustments to leave a certain eccentricity of the device, namely by the adjustment provided by means of nut 23 in the case of FIG. 1, or that provided by the nut 71 in the case of FIG. 5. Hence, at the beginning of the finishing phase of machining, translational movements will be provided about the generatrices of a cone starting from points eccentric in relation to the axis of the cone.

I claim:

1. In an electrical discharge machining arrangement for machining the surface of a recess in a workpiece electrode, in which relative movements of the electrodes are controlled to maintain given sparking conditions in a machining zone comprised between the electrodes, and comprising a device for controlling a translational displacement of one electrode relative to the other both in the direction of an axis of penetration of one of said electrodes into the other electrode and in a plane perpendicular to said axis, said device comprising a support for said one electrode, first means for moving the support in translation along said axis, and second means for moving the support in translation according to a predetermined amplitude in a plane perpendicular to said axis to provide a combined translational movement of the support along said axis and in said perpendicular plane, said second means comprising an eccentric member having, parallel to said axis of penetration, an axis in relation to which said support is fixed, the improvement comprising a rotatable shaft having an axis parallel to said axis of penetration, said eccentric member cooperating with said shaft for sliding in relation to said shaft in a direction forming a 45° angle with said axis of penetration and for rotating with said shaft about the axis of said shaft, and means for sliding said eccentric member relative to said shaft in response to movement of the support along said axis by said first means such that the amplitude of said translation of said support in said plane progressively increases as a function of the translational movement along said axis when advancing said support beyond a predetermined distance and decreases as a function of the translational movement along said axis when withdrawing said support to said predetermined distance.

2. The improvement of claim 1, comprising means for limiting the axial displacement of said shaft relative to a frame of the device to actuate sliding of said eccentric piece in response to movement of said support beyond a predetermined position of penetration of its electrode.

3. The improvement of claim 2, in which said means for sliding said eccentric member modifies its eccentricity as a function of the axial displacement of the support beyond said predetermined position.

4. The improvement of claim 2, comprising means for setting the axial position of the shaft relative to said support to set the eccentricity of said eccentric member at a predetermined value while said support has not reached said predetermined position.

5. The improvement of claim 4, in which said shaft is mounted coaxially with a rod relative to which it is fixed axially but free to rotate, said limiting means and said setting means cooperating with said rod.

6. The improvement of claim 2, in which said shaft is mounted coaxially with a rod relative to which it is fixed axially but free to rotate, said limiting means cooperating with said rod.

7. The improvement of claim 1, in which said eccentric member and said shaft have facing faces, linear guide means allowing relative sliding of said facing faces relative to one another along said direction, and means for holding said eccentric member and shaft together while allowing relative radial and axial displacements.

8. The improvement of claim 7, in which said shaft has a forked end part in which a part of the eccentric member is disposed.

9. The improvement of claim 7, in which said shaft is disposed within a casing on which said support is fixed axially but movable in translation perpendicular to the axis of the shaft, said shaft being mounted for axial movement and rotation in said casing by an annular ball slide disposed around said linear guide means of the shaft and the eccentric piece.

10. The improvement of claim 1, in which said eccentric member is a sleeve surrounding the shaft with play.

* * * * *

UNITED STATES PATENT AND TRADEMARK OFFICE
CERTIFICATE OF CORRECTION

PATENT NO. : 4,104,500
DATED : August 1, 1978
INVENTOR(S) : Georges Wyss

It is certified that error appears in the above-identified patent and that said Letters Patent are hereby corrected as shown below:

In the title: change "Cycle" to --Cyclic--.

Signed and Sealed this

Sixth Day of February 1979

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,104,500
DATED : August 1, 1978
INVENTOR(S) : Georges Wyss

It is certified that error appears in the above-identified patent and that said Letters Patent are hereby corrected as shown below:

In the title: Change "Cycle" to --Cyclic--.

Column 5, at the end of line 41 insert the following --Another comparator 99, supported by a bracket 101, is useful for checking the original relative position of the cross-slides, but forms no part of the present invention.--.

Column 5, line 47, change "55" to --59--

THIS CERTIFICATE SUPERSEDES CERTIFICATE OF CORRECTION ISSUED February 6, 1979.

Signed and Sealed this

Fourteenth Day of October 1980

[SEAL]

Attest:

SIDNEY A. DIAMOND

Attesting Officer

Commissioner of Patents and Trademarks